United States Patent

[11] 3,542,112

| [72] | Inventor | Leo J. Monty |
| | | Reading, Massachusetts |
| [21] | Appl. No. | 734,789 |
| [22] | Filed | June 5, 1968 |
| [45] | Patented | Nov. 24, 1970 |
| [73] | Assignee | Artisan Industries Inc. |
| | | Waltham, Massachusetts |
| | | a corporation of Massachusetts |

[54] THIN-FILM EVAPORATOR HAVING MULTI-ZONE TEMPERATURE CONTROL JACKET
9 Claims, 1 Drawing Fig.

[52] U.S. Cl. ............................................. 159/6,
159/44, 159/49
[51] Int. Cl. ............................................. B01d 1/22
[50] Field of Search ............................................. 159/6W,
6WH, 49, 44, 13

[56] References Cited
UNITED STATES PATENTS

| 2,866,499 | 12/1958 | Haley | 159/6W |
| 2,874,482 | 2/1959 | Haltmeier | 34/31 |
| 2,931,433 | 4/1960 | Mertz | 159/44X |
| 2,933,526 | 4/1960 | Guyer et al. | 260/555 |
| 2,974,725 | 3/1961 | Samesreuther | 159/6W |
| 2,994,643 | 8/1961 | Smalling | 202/160 |
| 3,124,624 | 3/1964 | Berlien et al. | 264/13 |
| 3,252,502 | 5/1966 | Eckhardt et al. | 159/6W |
| 3,311,457 | 3/1967 | Goossens | 159/6W |

*Primary Examiner*—Norman Yudkoff
*Assistant Examiner*—J. Sofer
*Attorneys*—Richard P. Crowley, Philip G. Kiely and Richard L. Stevens

ABSTRACT: A horizontally axised, rotary thin-film evaporator having a heat exchange jacket about the processing chamber with the jacket divided into two zones particularly useful for the processing of temperature sensitive resinous materials. The first zone is adapted for the introduction of saturated steam to remove as much of the solvent material being processed as possible without degradation of the resin. The second zone is adapted for the introduction of a liquid to regulate the temperature of the material below the degradation temperature.

Patented Nov. 24, 1970
3,542,112
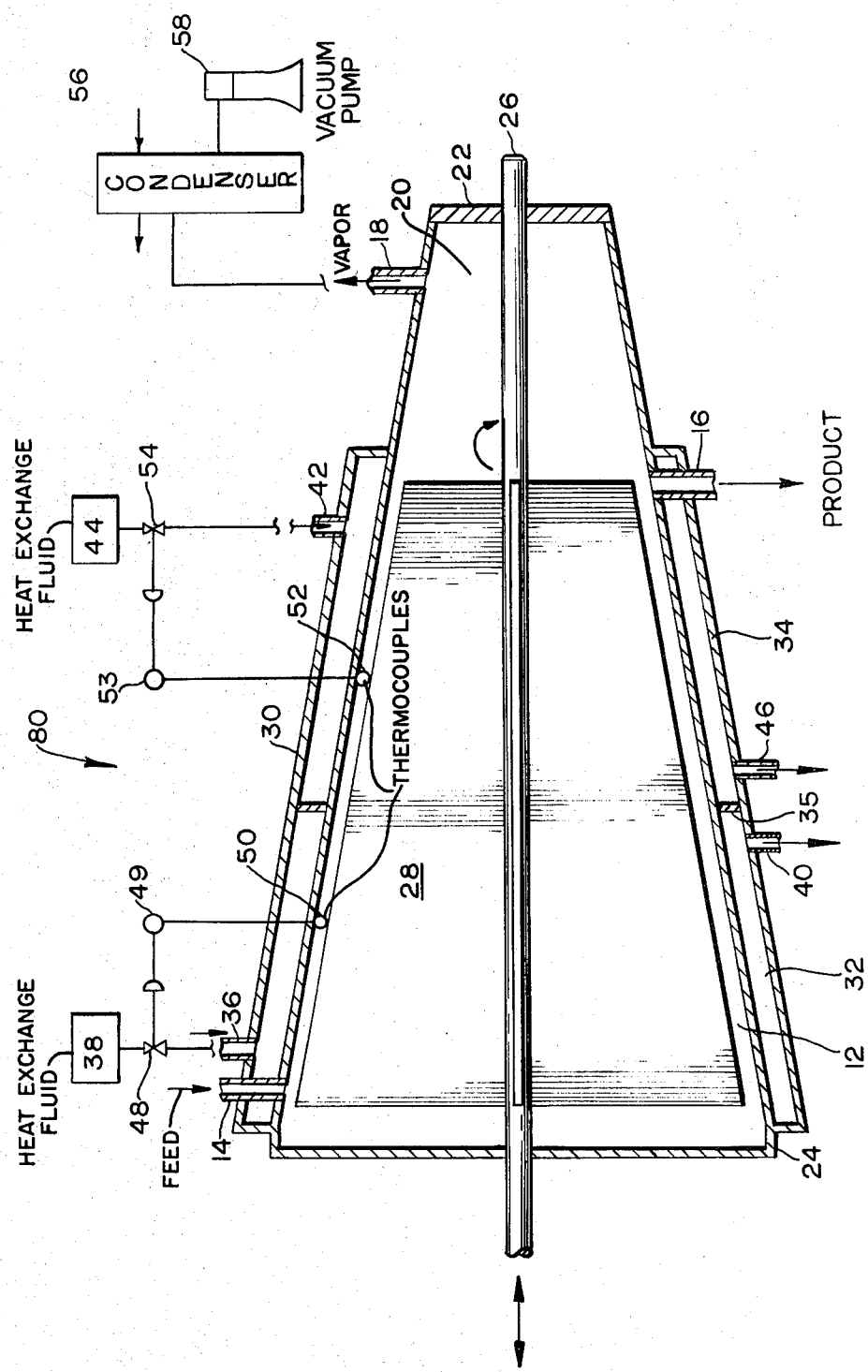
INVENTOR
LEO J. MONTY
BY Crossley, Kiely and Stevens
ATTORNEYS 3,542,112

THIN-FILM EVAPORATOR HAVING MULTI-ZONE TEMPERATURE CONTROL JACKET

BACKGROUND OF THE INVENTION

In the processing, treating, reacting or handling of organic resins, polymers, solutions or other materials, it is often desirable to remove a solvent or liquid material from a resin, solution, emulsion, slurry, suspension or mixture. One means to accomplish the removal of a solvent or liquid material is through the use of a thin-film technology, that is, a thin-film of the material to be concentrated is placed on the wall of the chamber to provide an increased surface for evaporation. Normally about this chamber is a heat exchange jacket to introduce heat into the thin-film thereby evaporating the solvent as desired. The thin film is generally placed on the walls of the chamber by means of rotor blades or the like, the ends of which during operation are spaced slightly apart from the interior wall of the chamber.

In the processing of materials in thin-film apparatus, the feed material to be concentrated is generally introduced into one end of the evaporator and the product removed from the other end and the vapor created by the evaporation of the solvent is withdrawn either from the product or feed end depending upon whether the vapor flow is countercurrent or concurrent. The degree of concentration required will determine the length of residence time of the material in the evaporator, the speed of rotation of the rotor blades and the temperature difference ($\Delta$ T) between the heat exchange material in the jacket and the thin-film on the interior wall of the chamber. Of course, the desired concentration of a residence time may also be controlled by slightly twisting the blades, (see for example U.S. Pat. No. 3,357,447) or by placing projections on the rotor blades, (see for example U.S. Pat. No. 3,348,600).

Generally, materials which are processed in a thin-film evaporator increase in viscosity as they move from the feed end to the product end. In the processing of resins and polymeric material, this increase in viscosity is often significant and causes considerable difficulty in processing the material and possible thermal degradation as the material approaches the product end of the evaporator. As materials become more viscous toward the product end of the evaporator they will commonly generate their own heat. This is caused by the action of the rotor blades placing the material in a thin-film condition on the interior wall of the chamber. This mechanical or frictional heat in combination with the heat exchange fluid introduced into the temperature control jacket may cause the material to thermally degrade by rising above its critical temperature (temperature sensitive) or by remaining for an excessive time at an elevated temperature (heat sensitive). This is particularly true with those materials which upon concentration are sensitive to thermal degradation and/or material change.

I have found in some instances that to concentrate a resin to the desired purity it would be necessary to make two or more passes through a single jacket thin-film evaporator. The first pass with a high temperature steam in the heat exchange jacket to concentrate the material to the point where the viscosity is such that the material being placed in a thin-film condition generates its own frictional heat. The second pass with a liquid in the heat exchange jacket at a lower controlled temperature to prevent or inhibit any thermal degradation of the material by regulating the temperature of the material below its critical level. However, the removal of process material from one thin-film unit and reintroduction into the same or another unit to obtain the desired concentration in a second or other passes is, of course, extremely time consuming and uneconomical.

I have invented an apparatus and process wherein feed materials to be concentrated subject to significant increases in viscosity during processing which might lead to degradation or damage to the material such as resins, may be effectively and economically concentrated as to the desired degree in a thin-film evaporator in a single pass operation. My apparatus and method prevents or inhibits thermal degradation of the material and optimizes processing economics.

SUMMARY OF THE INVENTION

Briefly, my invention embodies a multizone heat exchange jacket about a generally horizontally axised thin-film evaporating apparatus, wherein a heat exchange fluid or conveying vapor such as saturated or superheated steam is introduced into the first zone of the heat exchange jacket to provide evaporative heat, and a second fluid such as hot water or other heat-exchange liquid is introduced into the second zone of the heat exchange jacket to maintain a temperature in the downstream or product outlet section of the evaporator.

The feed material introduced into the thin-film evaporator is concentrated efficiently to an intermediate point between the initial concentration of the material and the final desired concentration, such as removal in the first zone of 50 to 80 percent by weight of the liquid as vapor, by using a high $\Delta$ T between the first heat exchange zone and thin-film on the interior wall of the chamber.

At this intermediate point in the concentration of the material the viscosity may be such that the placing of the material in the thin-film form on the interior wall of the chamber creates a frictional heat caused by the mechanical action of the blades. If the material is heat or temperature sensitive then at or about the point where the frictional heat becomes significant then it is most advantageous to control the temperature so that the material may be brought down to the desired concentration without increasing the temperature.

The second zone extends from this intermediate point to the product outlet and controls the temperature of the material to insure that it does not rise above the critical level. Accordingly, thermally sensitive materials may be concentrated in my evaporator in a single pass.

My apparatus may also be used wherein thin-film apparatus is used to carry out a reaction and once the reaction has reached the desired rate it may then be advantageous to maintain the same rate of reaction throughout the remainder of the reaction by controlling the reaction temperature.

It is of course recognized that in some instances thin-film apparatus may have used a plurality of heat exchange jackets for different purposes. For example, in thin-film apparatus the units are often sold in individual sections and each section has a heat exchange jacket about the external surface of the chamber itself. The sections are generally sold with interconnecting fittings so that they may be assembled and function in series. Also in horizontal thin-film evaporators, particularly in the larger units during the fabrication of the equipment, a rib may be placed about the outer wall of the evaporator to increase the structural strength of the unit and this rib may serve as a baffle between succeeding sections of the heat exchange jacket. However, these evaporators are not designed as in my apparatus and do not function the same way. In operation these evaporators use a single heat exchange fluid for all temperature control and not the combination of a heating gas and a heat exchange liquid required for my invention.

My improved thin-film processing apparatus with a multizone heat exchange jacket provides for optimum efficiencies in processing materials wherein the concentrated material is particularly sensitive to thermal degradation and/or change. Further, it is also designed to maintain the temperature of the material so that the viscosity does not become so great that it is difficult or impossible to remove from the evaporator.

In my invention the first zone which may be one or more separate sections or zones employs a condensing vapor, such as saturated steam to provide for the heating of the feed material being processed. The second zone which also may be composed of one or more sections or zones employs a heat exchange fluid preferably a liquid such as water, Dowtherm or the like to provide for raising or lowering the temperature of the process material to a desired temperature by acting as a heat sink. Such an apparatus and process overcomes many of the difficulties associated with the past procedures of handling material which have high viscosity of 100,000 c.p.s., or over during evaporative thin-film processing.

BRIEF DESCRIPTION OF THE DRAWINGS

The drawing is a schematic illustration of the preferred embodiment of my invention.

DESCRIPTION OF THE PREFERRED EMBODIMENT(S)

My invention is shown generally at 10 and comprises in combination a horizontally axised rotary thin-film evaporator 10, comprising a closed frustoconical chamber 12 having interior walls. The chamber 12 is characterized by a feed inlet 14 at the one end, a product outlet 16 at the opposite end thereof and the chamber wall converges from the feed inlet to the product outlet. A vapor outlet 18 extends from a vapor chamber 20 adjacent the product end of the evaporator. Closing heads 22 and 24 are secured to either end of the chamber 12 and support a horizontal centrally axised tube like rotor 26 which extends from one to the other end of the chamber 12 and through the vapor chamber 20. The rotor 26 is driven by a motor or other means (not shown) and generally extends outwardly from each end of the closing heads 22 and 24. The rotor shaft 26 is mounted for axial displacement or adjustment by any desired or convenient means and may include a series of grooves or threads which locate the rotor shaft with respect to the closing heads 22 and 24. Extending radially outward from the rotor shaft 26 are a plurality of radially extending rotor blades 28 the tips or peripheral edges of which extend into a small generally uniform closely spaced relationship with the interior wall of the chamber 12 so that upon rotation of the rotor shaft 26 the rotor blades provide a thin-film material on the interior wall of the chamber 12.

A temperature control jacket 30 surrounds the chamber 12. The temperature control jacket is divided into a first heat introduction zone 32 and a second heat exchange zone 34 by a partition 35. The zone 32 has an inlet 36 for the introduction of an exchange vapor such as saturated steam from a source 38 and an outlet 40 for the removal of the heat exchange fluid. The first zone is located around the chamber 12 at the upstream end thereof and extends downstream from the feed inlet 14. The temperature in the zone 32 and therefore the temperature of the chamber wall jacketed by the zone is controlled by the thermocouple 50 in communication with a temperature recorder control 49, and a flow control valve 48. The flow control valve is disposed on the inlet 36.

The second zone 34 is located about the product outlet end of the evaporator and downstream of the first zone 32. This zone 34 is characterized by an inlet 42 for the introduction of heat exchange fluid, such as steam, cold water or the like from a source 44. The heat exchange fluid is removed from the zone 34 through outlet 46. The temperature in zone 34 is regulated by the use of a thermocouple 52 in communication with a temperature recorder control 53 and a flow control valve 54. The valve 54 is disposed on inlet 42.

The condensed steam removed from the outlet 40 of the first zone may be recycled through a heat exchange medium to maintain the temperature in the zone 34. The condenser 56 condenses the vapors from the vapor chamber 20, and vacuum pump 58 maintains the system at the desired pressure.

My preferred embodiment will be described in detail with reference to the concentration of a resin, such as a vinyl resin and more particularly the concentration of a polyvinylacetate from 15 percent water and 85 percent resin to a purity of 0.2 to 0.3 percent water.

In the operation of my apparatus a vinyl resin such as a polyvinylacetate resin containing about 15 percent water by weight is introduced into the chamber 12 through the inlet 14 at a temperature of about 140°F. and placed into a turbulent wiped thin-film condition on the inside of the chamber wall by the rotation of the rotor blades 28. The evaporator 10 is maintained at a pressure of about 160 mm. by the vacuum pump 58. Saturated steam at 250°F. from source 28 is introduced into the zone 32 and through inlet 36 and withdrawn through the outlet 40. The heat of the saturated steam is transmitted through the chamber wall between the zone 32 and the chamber 12 causing the water to be driven off or evaporated from the thin-film of material on the chamber wall. The water vapor enters the vapor chamber 20 and passes through the vapor outlet 18.

As the resin moves from the feed end toward the downstream portion of the processing chamber surrounded by the zone 32, the resin increases in viscosity as the percent water in the resin decreases. The driving force between the zone 32 and the interior wall of the chamber 12 is maintained at a high $\Delta T$ in order to strip as much of the water as possible from the resin in the shortest time possible. When the resin being processed reaches the end of the first zone 32, the temperature is about 170°F. Thermocouple 50 secured to the chamber wall is in communication with the flow control valve 48 and the temperature recorder control 49. This insures that the driving force between the zone 32 and the chamber will be properly maintained by regulating the amount of steam entering the zone 32.

When the resin has progressed about half way down the length of the evaporator and enters the downstream section of the processing chamber surrounded by the zone 34, it is about four percent water by weight and 170°F. The viscosity of the material now will begin to increase significantly. The wiping of the resin on the interior wall of the chamber 12 becomes more difficult and the action of the rotor blades causes the resin to increase significantly in temperature because of frictional heat. Above temperatures of about 215°F. the resin will begin to thermally degrade. However, it is desired to remove the resin at about 215°F., at which temperature the material is concentrated to the degree purity desired. Thus, it is important that the temperature of the zone 34 be controlled in order that the resin does not rise above 215°F. It has been found that the frictional heat of the resin being processed is more than adequate to boil off the solvent. Accordingly, maintaining a jacket temperature of 185°F. in the zone 34 is sufficient to insure that the resin will be discharged at a temperature 215°F.

A liquid such as water is introduced into the zone 34 through the inlet 42 and withdrawn through the outlet 46. If desired, this water may be recycled. The thermocouple 54 in the chamber wall 12 is in communication with flow control valve 54 to regulate the amount of fluid material entering the zone 34. Thus the zone 34 acts as a heat sink to withdraw heat from the material being processed as is necessary. If the resin temperature as measured by the thermocouple 52 runs about 215°F., then the flow rate of liquid in the zone 34 is increased to remove additional heat from the resin. The resin is removed from the product outlet at about 215°F. Accordingly, with my invention a thermally sensitive viscous material may be concentrated to the desired purity in one pass.

As the material increases in viscosity as explained above, the thermocouple 52 in coordination with the flow control valve 54, regulates the temperature of the material being processed by controlling the temperature of the zone 34. Since the heat created when the material becomes more viscous is created by the action of the rotor blades wiping the material on the interior wall of the chamber, it is also possible to control the temperature by varying the rotor speed. For example, if the product temperature were rising above the jacket temperature, the rotor speed could be lowered thus reducing the frictional heat and bringing the temperature down to the proper point. Conversely, if the temperature were dropping below the jacket temperature, then the rotor speed could be increased to create more frictional heat within the material to increase the temperature.

It is obvious that any fluid materials may be used in either of the zones described as long as the first section achieves a $\Delta T$ or driving force between the heat exchange section and the material being processed and as long as the fluid used in the second section controls the temperature of the material. That is, it may be used to introduce or withdraw heat into or from the material. Also, my apparatus and method may be used for the processing, handling of organic resins, elastomers or polymers when it is often desirable to remove a solvent or liquid material from a resin, solution, emulsion, slurry, suspension or mixture.

My invention has been described in connection with a multizone jacket; however, in certain operations wherein economics or other factors permit, and in accordance with my teachings, a feed material may be processed through a number of the same or different single control temperature jacketed thin-film evaporators employing in the first a heating fluid to remove or strip liquid material in one or more operations and thereafter processing this resulting material employing a heat exchange liquid in the evaporators to prevent thermal damage or degradation of the material.

My invention has been described in particular in reference to a tapered horizontally axised rotary thin-film evaporator, wherein the feed is introduced at the large diameter end and the product withdrawn from the small diameter end. However, it may also be used in vertical evaporators as well as in those horizontally axised straight sided or inclined axised evaporators. Further, it is obvious that the heat exchange jacket may have two or more zones as desired of varying width about the chamber wall, when it is desired to concentrate a temperature sensitive material in one pass through a thin-film evaporator.

I claim: 1. A horizontally-axised rotary thin-film evaporator which comprises in combination:
 a. a closed processing chamber characterized by an interior wall defining a surface of revolution;
 b. a rotor shaft within the chamber;
 c. means to rotate the rotor shaft;
 d. rotor blades secured to and extending from the rotor shaft for rotation therewith, the blades generally radially, and coaxially arranged from the rotor shaft and extending into a close relationship with the interior wall of the chamber;
 e. an inlet in the chamber for the introduction of material to be processed;
 f. an outlet axially spaced apart from the inlet for the removal of process material;
 g. an outlet for the removal of vapor from the chamber;
 h. a temperature control jacket about the processing chamber, including means to divide the jacket into at least a first and second zone, the first zone characterized by an inlet for the introduction of a first heat exchange fluid and an outlet for the removal of the first heat exchange fluid; the second zone characterized in an inlet for the introduction of a second heat exchange fluid and in an outlet for the removal of the second heat exchange fluid;
 i. first means to measure the temperature of the material in the processing chamber encompassed by the first zone;
 j. means to control the flowrate of the H.E. fluid in the first zone in response to the first measuring means so as to maintain a greater temperature in the first zone than the material being processed in the processing chamber surrounded by said first zone;
 k. second means to measure the temperature of the material in the processing chamber encompassed in the second zone;
 l. second means to control the flowrate of the H.E. fluid in the second zone at a lower temperature than the H.E. fluid in the first zone in response to the second measuring means so as to maintain the temperature of the material being processed in the chamber encompassed by the second zone at or about a fixed temperature lower than that of the material surrounded by the first zone;
 m. a first source adapted to introduce the first heat exchange fluid into the first zone; and
 n. a second separate source adapted to introduce the second heat exchange fluid into the second zone whereby material introduced into the processing chamber and placed into a thin-film condition on the interior wall of said chamber is continuously heated at progressively higher temperatures as it progresses down the chamber wall surrounded by the first zone to evaporate as much of the solvent as possible from the material as it increases in concentration and viscosity as it progresses down the chamber and then passes into the downstream portion of the chamber surrounded by the second zone where the temperature of the material on the interior wall of the chamber is maintained at or about a fixed lower temperature until the material is removed from the product outlet.

2. The apparatus of claim 1 wherein the closed processing chamber converges from the feed end of the evaporator toward the product end of the evaporator and the means to divide the heat exchange jacket into a first and second zone includes a riblike partition element extending from the chamber wall to the temperature control jacket in a sealtight manner.

3. The apparatus of claim 1 wherein the means to measure the temperatures of the material being processed in the processing chamber includes thermocouples disposed on the chamber wall.

4. The apparatus of claim 1 wherein the means to control the flowrates of the fluids in the respective zones disposed downstream of the source include flow control valves responsive to changes in the temperatures of the processed material vaporized by the respective zones.

5. A process for the concentration of a substance in a liquid feed material which feed material during concentration is subject to an increase in viscosity and to degradation at or above an elevated temperature which process comprises:
 a. forming a continuous wiped turbulent thin-film of said liquid feed material on the interior wall of a generally cylindrical chamber;
 b. flowing the thin-film continuously through at least first and second heat exchange zones;
 c. progressively increasing the temperature of the thin-film material in the first zone by placing a H.E. fluid having a higher temperature than the thin-film material into an indirect heat exchange relationship with said material to concentrate said material without thermal degradation;
 d. flowing the continuous thin-film from the first zone to the second zone;
 e. placing the concentrated thin-film feed material in the second zone into an indirect heat exchange relationship with a second H.E. fluid, the temperature of the second H.E. fluid being lower than that of the first H.E. fluid, and maintaining the temperature of the thin-film material in the second zone at a degree not exceeding a predetermined level while continuing to concentrate further the material to the desired level and while preventing the viscous concentrated material being processed from exceeding the predetermined temperature level which would degrade the product material.

6. The process of claim 5 wherein the material is a vinyl resin and the first heat exchange fluid is saturated steam and the second H.E. fluid is a liquid.

7. The process of claim 6 wherein the vinyl resin to be concentrated has a liquid content of about 25 percent and is introduced into the evaporator at or about a temperature of 150°F. and the saturated steam is at a temperature at or about 285°F., and the thin-film material is heated until it reaches a temperature of about 170°F., the material thereafter increasing in viscosity, the second heat exchange fluid is maintained at a temperature of about 170°F. whereby the thin-film material is maintained at or below a temperature of 215°F. and is discharged at this temperature.

8. The process of claim 5 which further includes measuring the temperature of the thin-film material in Step a), and utilizing the measurement to control the flowrate of the first heat exchange fluid; measuring the temperature of the concentrated thin-film material in Step c), and controlling the temperature of the second thin-film fluid.

9. The process of claim 5 which includes working the concentrated feed material to Step c) whereby it creates its own frictional heat.